US010844159B2

(12) United States Patent
Golini et al.

(10) Patent No.: US 10,844,159 B2
(45) Date of Patent: Nov. 24, 2020

(54) POLYURETHANE FOAMS WITH AGRICULTURAL BY-PRODUCTS

(71) Applicant: DOW GLOBAL TECHNOLOGIES LLC, Midland, MI (US)

(72) Inventors: Paolo Golini, Reggio Emilia (IT); Giuseppe Vairo, Correggio (IT); Matthew A. Robinson, Indianapolis, IN (US); Swithin P. Adu-Peasah, Lexington, KY (US)

(73) Assignee: Dow Global Technologies LLC, Midland, MI (US)

( * ) Notice: Subject to any disclaimer, the term of this patent is extended or adjusted under 35 U.S.C. 154(b) by 71 days.

(21) Appl. No.: 16/093,392

(22) PCT Filed: May 22, 2017

(86) PCT No.: PCT/US2017/033823
§ 371 (c)(1),
(2) Date: Oct. 12, 2018

(87) PCT Pub. No.: WO2017/205282
PCT Pub. Date: Nov. 30, 2017

(65) Prior Publication Data
US 2019/0119432 A1    Apr. 25, 2019

(30) Foreign Application Priority Data
May 24, 2016 (IT) ..................... 102016000052976

(51) Int. Cl.
*C08G 18/08* (2006.01)
*C08G 101/00* (2006.01)
*C08G 18/64* (2006.01)
*C08G 18/76* (2006.01)

(52) U.S. Cl.
CPC ......... *C08G 18/6492* (2013.01); *C08G 18/14* (2013.01); *C08G 18/7664* (2013.01); *C08G 2101/0025* (2013.01); *C08G 2101/0075* (2013.01)

(58) Field of Classification Search
CPC .............. C08G 18/6492; C08J 2497/00; C08J 2497/02
See application file for complete search history.

(56) References Cited

U.S. PATENT DOCUMENTS

| | | | |
|---|---|---|---|
| 3,753,933 A | 8/1973 | Olstowski et al. | |
| 4,032,483 A | 6/1977 | Hartman | |
| 4,197,372 A * | 4/1980 | Hostettler | C08G 18/6484 127/71 |
| 5,254,641 A | 10/1993 | Alex et al. | |
| 5,614,564 A | 3/1997 | Hwang et al. | |
| 6,790,926 B1 | 9/2004 | Spijkers et al. | |
| 2008/0255262 A1* | 10/2008 | De Vos | C08G 18/4829 521/155 |
| 2009/0110654 A1* | 4/2009 | Hagemann | A61L 9/014 424/76.1 |

FOREIGN PATENT DOCUMENTS

| | | |
|---|---|---|
| EP | 1834993 B1 | 2/2009 |
| JP | 55086810 A * | 7/1980 |
| WO | 2004011518 A3 | 12/2008 |
| WO | 2015021541 | 2/2015 |
| WO | 2015076847 | 5/2015 |

OTHER PUBLICATIONS

Machine Translation of JPS55-86810A. Jul. 1, 1980. (Year: 1980).*
Written Translation of Tables 1 and 2 of JPS55-86810A. Jul. 1, 1980. (Year: 1980).*
Aton-Yulianto, E. G. et al. Improvement particle size fineness of corn flour by addition of papin enzyme and its effects to their hardness, morphology and pasting properties. Food Science and Quality Management, 2013, 18, pp. 9-17. (Year: 2013).*
Jane, J. et al. Preparation and properties of small-particle corn starch. Cereal Chem. 1992, 69(3), pp. 280-283. (Year: 1992).*
Flanigan, V., et. al., "Preparation of Soy hull Augmented Polyurethanes and Assessment of Their Conductivity and Gas Permeability," 2007.
Ribeiro Da Silva, V. et. al., "Polyurethane foams based on modified tung oil and reinforced with rice husk ash I: Synthesis and physical chemical characterization," Polymer Testing, 2013, p. 438-445, v. 32. No. 2, 3.

* cited by examiner

*Primary Examiner* — Stephen E Rieth

(57) ABSTRACT

A method of producing a polyurethane based foam that includes providing a ground crop residue having an average particle size of less than 10 mm and that is prepared by grinding crop residues, providing a polyurethane system that includes an isocyanate component and an isocyanate-reactive component, of which the polyurethane system has an isocyanate index from 70 to 350, forming a modified polyurethane system by adding the ground crop residue to the polyurethane system in a range from 1.0 wt % to 20.0 wt %, based on a total weight of the modified polyurethane system, and forming the polyurethane based foam so as to have an applied density from 30 kg/m3 to 75 kg/m3, according to ASTM D-1622, and to have the ground crop residue embedded within polyurethane polymers that are a reaction product of the isocyanate component and the isocyanate-reactive component of the polyurethane system.

6 Claims, No Drawings

POLYURETHANE FOAMS WITH AGRICULTURAL BY-PRODUCTS

FIELD

Embodiments relate to polyurethane based foams, e.g., rigid polyurethane foams, that include crop residues embedded therewithin, products incorporating such polyurethane based foams, and methods of manufacturing such polyurethane based foams and products incorporating such polyurethane based foams.

INTRODUCTION

Polyurethane foam based insulting materials are often the preferred choice in construction and cold chain applications over other materials such as fiber glass and rock wool, when high insulation performance is sought. Polyurethane foams may typically provide certain favorable properties over lower cost alternatives, such as rigidity and limited air permeability. The possibility of incorporating low cost by-products in such polyurethane foams is sought, without adversely impacting thermal conductivity.

SUMMARY

Embodiments may be realized by providing a method of producing a polyurethane based foam that includes providing a ground crop residue having an average particle size of less than 10 mm and that is prepared by grinding crop residues, providing a polyurethane system that includes an isocyanate component and an isocyanate-reactive component, of which the polyurethane system has an isocyanate index from 70 to 350, forming a modified polyurethane system by adding the ground crop residue to the polyurethane system in a range from 1.0 wt % to 20.0 wt %, based on a total weight of the modified polyurethane system, and forming the polyurethane based foam so as to have an applied density from 30 kg/m³ to 75 kg/m³, according to ASTM D-1622, and to have the ground crop residue embedded within polyurethane polymers that are a reaction product of the isocyanate component and the isocyanate-reactive component of the polyurethane system.

DETAILED DESCRIPTION

It is proposed that ground crop residues may be incorporated in polyurethane based foams (such as rigid polyurethane foams), so as to increase the amount of byproducts in the resultant foam, without significantly adversely impacting thermal conductivity such that the polyurethane based foam would be suitable for use as insulation and/or in insulation products. Crop residues are defined as field residue materials left in an agricultural field or orchard after the crop has been harvested or material that is collected with the crop, but is discarded as a low value by-product during processing of the crop. Crop residues may be composed of polymers including cellulose, hemi-cellulose and/or lignin, which have the potential to act as an insulating product, along with additional benefits.

The use of certain crop residues in the polyurethane based foam may allow for increased ability to vary a water vapor diffusion resistance factor of the resultant polyurethane based product, in an effort to tailor the water vapor diffusion resistance factor (also referred to as µ-value) to the intended use of the polyurethane based product. Water vapor diffusion is the transfer of vapor through a barrier material such as a polymer or composite to the other side. The process involves three stages: (i) absorption, whereas vapor molecules are absorbed onto the surface of the barrier material, (ii) diffusion, whereas absorbed molecules migrate through the medium to the opposite side due to concentration differential, and (iii) desorption, whereas migrated molecules evaporate from the second surface of the barrier material. The process is typically driven by vapor concentration gradient, until the partial pressure reaches equilibrium. While, all polymers are permeable to some degree, the permeability may be affected by physical and chemical properties of vapor, barrier material, and/or environmental conditions including: (a) chemical affinity between vapor and barrier (e.g., vapor can be absorbed more easily onto the surface and this can cause the polymer chains to more likely swell, thus allowing easier penetration of the vapor molecules), (b) voids or cracks in the barrier or polymer material (e.g., which may create paths with less resistance, that could further compromise the barrier integrity), and/or (c) temperature (e.g., higher temperature increases molecules mobility and hence faster diffusion).

Water vapor diffusion resistance factor is a measure of the material's relative reluctance to let water vapor pass through the material, as measured in comparison to the properties of air. The µ-value is a property of the bulk material and is multiplied by the material's thickness when used in a particular construction. In other words, the µ-factor is a dimensionless number describing how many times better a material is at resisting the passage of water vapor, compared with an equivalent thickness of air. Whereas, the lower the µ-value, the thicker the insulation should be to achieve the same reduction of water vapor diffusion. In some instances a water vapor diffusion resistance factor of 28.0 (e.g., 15.0 to 28.0) and less may be sought, and in other instances a water vapor diffusion resistance factor of greater than 28.0 (e.g., greater than 28.0 to 45.0) may be sought. For example, in certain insulation applications (such as when the ability for the inside of a wall or compartment to be able to dry out due to accumulation of water from condensation on pipes or other means), an insulation material with a low water vapor diffusion resistance factor may be sought. Further, in certain insulation applications with a large temperature gradient such as cold storage applications, a high water vapor diffusion resistance factor may be sought to limit diffusion of water from the hot side into the insulation and condensing either in the insulation or on the cold side. Accordingly, it would be advantageous to be able to readily adjust the resultant water vapor diffusion resistance factor of the resultant foam, without having to resort to merely adjusting thickness, based on the planned use of the polyurethane based foam and/or product including the polyurethane based foam.

Further, in instances where the resultant polyurethane based foam is situated near and/or exposed to environments with a strong presence of moisture (e.g., as related to special industrial processing) or environments with significant temperature differences between external and internal environment (e.g., as related to cold storage) it may be necessary at the design stage to provide for the possible inclusion of a vapor barrier on the "warm side" of the structure to reduce the possibility of, minimize, and/or avoid condensation within the structure and/or in the insulation core itself. Derivative side effects of the presence of such condensation may be, among others, increased thermal conductivity and/or mold growth.

The polyurethane system for forming the polyurethane based foams (such as rigid polyurethane foams) may be prepared as one-component or two-component systems, both of which rely the presence of polyurethane polymers that are the reaction product of an isocyanate moiety provided from an isocyanate component with an isocyanate-reactive moiety provided from an isocyanate-reactive component to form polyurethane polymers. The resultant polyurethane based foam has an applied density from 30 kg/m$^3$ to 75 kg/m$^3$ (e.g., 30 kg/m$^3$ to 70 kg/m$^3$, 30 kg/m$^3$ to 50 kg/m$^3$, 35 kg/m$^3$ to 45 kg/m$^3$, etc.) according to ASTM D-1622. The applied density may be an applied mold density. The polyurethane based foam may be a closed-cell foam having 80% or greater closed cells (as compared to opened cells) based on the total number of cells.

The composition for forming the polyurethane based foam includes ground crop residue in an amount from 1.0 wt % to 20.0 wt % (e.g., 1.5 wt % to 20.0 wt %, 1.5 wt % to 15.0 wt %, 1.5 wt % to 10.0 wt %, 1.8 wt % to 8.2 wt %, 2.0 wt % to 8.0 wt %, etc.), based on a total weight of the composition for forming the polyurethane based foam. The ground crop residue may be in the form of a powder having an average particle size of less than 10 mm, e g , in the form of a powder formed with solid particles. The ground crop residue may be in the form of solid particles that form a powder, but may be introduced into a reaction mixture for forming the polyurethane based foam as a slurry (e.g., mixed with a liquid component of the composition).

With the ground crop residue, the composition may be a modified polyurethane system, in which the ground crop residue is included in an isocyanate component and/or isocyanate reactive component of a polyurethane system (i.e., a system for forming the polyurethane based foam). For example, at least a portion the ground crop residue may be included with at least a portion of the isocyanate-reactive component, e.g., mixed with the isocyanate-reactive component and/or mixed with a polyol and/or reactive diluent from the isocyanate-reactive component. For example, the ground crop residue may be mixed with a polyol and/or reactive diluent as a third stream that is used in the manufacture of the polyurethane based foam, whereas a first stream may include the isocyanate component and the second stream may include the remaining portion of the isocyanate-reactive component that is not included in the third stream. An upper limit of the allowable range for the amount of ground crop residue may be based on a resultant viscosity of the component(s) in which the ground crop residues are incorporated. The ground crop residue may be non-reactive with the other components in the composition of the modified polyurethane system.

The resulting initial thermal conductivity of the polyurethane based foam, e.g., at 10° C., may not be adversely affected by the presence of the crop residues and/or ground crop residue (when referring to a polyurethane based foam prepared using the same method and components, except the only difference is the ground crop residue is excluded). For example, the polyurethane based foam that includes the ground crop residue may have a good thermal conductivity, such as a thermal conductivity of 25.0 mW/m·° K at 10° C. or less (e.g., from 5.0 to 25.0 mW/m·° K at 10° C., 15.0 to 25.0 mW/m·° K at 10° C., 18.0 to 25.0 mW/m·° K at 10° C., etc.), as measured according to EN 12667.

The water vapor diffusion resistance factor (μ-factor) of the polyurethane based foam may be modifiable with varying amounts of the ground crop residue incorporated into the composition for forming the polyurethane based foam. For example, in exemplary embodiments, a water vapor diffusion resistance factor may be increased approximately from 40% to 50% (e.g., 46%) by including approximately 8 wt % of ground sunflower hulls into the composition for forming the polyurethane based foam, as compared to when a same composition except that it excludes the ground sunflower hulls is used to form a polyurethane based foam.

The polyurethane based foam may have a water vapor resistivity factor between 10.0 to 60.0, as measured according to EN 12086. Across at least a portion of the range (e.g., from the 1.0 wt % to the 20.0 wt %, from the 1.5 wt % to the 10.0 wt %, from the 1.5 wt % to the 8.5 wt %, from the 1.8 wt % to the 8.2 wt %, etc.) for the amount of the ground crop residue (e.g., as a powder) included in the polyurethane system, the water vapor resistivity factor may increase as the amount of the ground crop residue used in the polyurethane system increases. Similarly, across at least a portion of the range (e.g., from the 1.0 wt % to the 20.0 wt %, from the 1.5 wt % to the 10.0 wt %, from the 1.5 wt % to the 8.5 wt %, from the 1.8 wt % to the 8.2 wt %, etc.) for the amount of the ground crop residue included in the polyurethane based foam, the water vapor resistivity factor may increase as the amount of the ground crop residue in the polyurethane based foam increases. In exemplary embodiments, the water vapor resistivity factor may be variable by at least 90% across a range (e.g., of 1.5 wt % to 8.5 wt %) for the amount of the ground crop residue, whereas at a high end of the range the water vapor resistivity factor is at least 90% greater than at a low end of the range.

In exemplary embodiments, the water vapor resistivity factor may be variable in a range between 10.0 to 60.0 (e.g., 15.0 to 50.0, 18.0 to 39.0, 19.0 to 38.2, etc.) by varying the amount of the crop residue included within the polyurethane foam and/or polyurethane system. For example, when the ground crop residue (e.g., as a powder) is included in the composition for forming the polyurethane based foam in a first amount within the range for inclusion of the ground crop residue (such as 1.0 wt % to 20.0 wt %, 1.5 wt % to 20.0 wt %, 1.5 wt % to 15.0 wt %, 1.5 wt % to 10.0 wt %, 2.0 wt % to 8.0 wt %, etc.), a water vapor diffusion resistance factor of the polyurethane based foam may be 28.0 or less (e.g., from 15.0 to 28.0, from 18.0 to 28.0, etc.). Further, when the ground crop residue is included in a second amount that is greater than the first amount and is within the range for inclusion of the ground crop residue, the water vapor diffusion resistance factor of the polyurethane based foam may be greater than 28.0 (e.g., greater than 28.0 and up to 45.0, from 28.5 to 39.0, etc.).

In exemplary embodiments, the range for inclusion of the ground crop residue (e.g., as a powder) may be divided into a lower sub-range and an upper sub-range that together encompass lower and upper (e.g., non-overlapping portions) of the range for inclusion of the ground crop residue (e.g., such that an entirety of the range is essentially divided into two separate, essentially non-overlapping sub-ranges). The lower sub-range covers a relatively lower weight percentage value portion of the range for inclusion of the ground crop residue and the upper sub-range covers a relatively higher weight percentage value portion of the range for inclusion of the ground crop residue. In such exemplary embodiments, when the ground crop residue is included in an amount within the lower sub-range, a water vapor diffusion resistance factor of the polyurethane based foam may be 28.0 or less (e.g. from 15.0 to 28.0, from 18.0 to 28.0, etc.), and when the ground crop residue is included in an amount within the upper sub-range, the water vapor diffusion resistance factor of the polyurethane based foam may be greater than 28.0 (e.g., greater than 28.0 and up to 45.0, from 28.5 to 39.0, etc.). In exemplary embodiments, the lower sub-range may encompass use of at least 2.0 wt % to 4.5 wt % of ground sunflower hull crop residue powder and the upper sub-range may encompass use of at least 6.0 to 8.0 wt % of ground sunflower hull crop residue powder.

The polyurethane based foam may be a blown rigid polyurethane foam. The rigid polyurethane foam may be used in insulation, e.g., as an insulating member of an insulating panel. The insulating panel may include a base substrate and the insulating member may be formed on the base substrate. Processes for preparing blown rigid polyurethane compositions would be known to a person of ordinary skill in the art, and such compositions may be used in the cold chain industry (e.g., to ensure narrow temperature control for products such as pharmaceuticals, vaccines, and food throughout their storage and shipping cycles). For example, the blown rigid polyurethane foam may be prepared using a chemical and/or physical blowing agent. The blown rigid polyurethane foam may be prepared using at least water and/or a hydrochlorofluoroolefin as a blowing agent.

Crop Residues

Crop residues may be defined as field residue materials left in an agricultural field or orchard after the crop has been harvested or material that is collected with the crop, but is discarded as a low value byproduct during processing of the crop. However, it is proposed that grindable crop residues (which may also be referred to as millable crop residues) may be used as additives in polyurethane based foam products. By grindable it is meant the material is sufficiently solid to be ground into fine particles. The fine particles may have an average particle size (also referred to as average value of particle size distribution based on a number distribution model) of less than 10 mm, less than 2 mm, less than 1 mm, less than 800 μm, and/or less than 650 μm. The average particle size may be greater than 0.1 nm. The grindable crop residues may be incorporated as ground crop residue into the composition for forming the polyurethane based foam, such that the ground crop residues are embedded within a polyurethane matrix in the resultant foam. The grindable crop residues may be dried, e.g., before being ground, so as to be dried, ground crop residues. The grindable crop residues are non-woody, e.g., are derived from herbaceous crops that tend to be annual plants that have not developed enough to form woody stems. The grindable crop residues may be derived from cereal grain crops and/or oilseed crops. The grindable crop residues may not be derived from legume crops, which encompasses oil (such as cooking oil) production using legume crops.

By annual it may be meant crops that grow from seed and produce a crop in one growing season (which growing season is less than one year and/or less than six months). For example, non-woody crop residues may exclude perennial plants such as trees and shrubs that have developed woody stems. Exemplary non-wood crop residues are discussed in International Publication No. WO 2004/011518.

Exemplary cereal grain crop residues come from corn, rice, barley, oat, millet, and wheat crops. Exemplary oilseed crops residues come from the production of sunflower oil, canola oil, flaxseed oil, and sesame oil. The grindable crop residues may be non-legume derived, i.e., not derived from a plant in the family Fabaceae or Leguminosae. Exemplary, legume crops include beans, soybeans, lentils, peanuts, and peas. Exemplary embodiments may exclude soybean hulls, or other crop residues from such legume crops.

Exemplary grindable crop residues include hulls (also referred to as husks), stover, residual fibers, and roots. By hull/husk it is referred to as the outer shell or coating of a seed. Exemplary hulls include sunflower hulls, corn husks, rice hulls, barley hulls, oat hulls, millet hulls, and wheat hulls. Hulls/husk may be collected as part of the seed during harvesting. During processing of the seed, the hulls may be removed, as in the case of soybean, sunflower, rice, oats, barley and other cereal grains and oilseed crops. In order to avoid accumulation of the hulls at processing facilities, byproduct uses for the hulls must be found in order to avoid disposal cost. Hulls have been used in several low value applications such as used as fiber rich animal feed, burned for their fuel value, and in some cases are landfilled at the cost of the processor. In exemplary embodiments, the hulls may be from cereal grain crops and/or oilseed crops, and not from legume crops. Exemplary embodiments include ground sunflower hulls, which may be an agricultural byproduct of sunflower oil production and is traditionally incinerated to recover the fuel value. The ground sunflower hulls may have a median particle size of less than 800 μm (e.g., greater than 200 μm and/or greater than 400 μm).

By stover it is referred to as the leaves and stalks of field crops, such as corn (maize) or sorghum that are commonly left in a field after harvesting of the field crops. The stover may include risdual hulls/husks. The stover used in the exemplary embodiments the crop residues may be from cereal grain crops and/or oilseed crops, and not from legume crops. By residual fibers it is referred fibers such as bagasse and corn fibers. Bagasse includes fibrous matter that remains after sugarcane or sorghum stalks are crushed to extract their juice. Roots of the crops can be described as part of a plant that attaches it to the ground or to a support (typically underground), designed to convey water and nourishment to other portions of the plant via branches and fibers.

Polyurethane Based Foam

Polyurethane based foams, such as rigid polyurethane foams, contain urethane moieties and are made by starting materials that include an isocyanate component and an isocyanate-reactive component. The composition for forming the polyurethane based foam may be prepared using an one-component system or a two-component system. In the one-component system, an isocyanate component and an isocyanate-reactive component (whereas the isocyanate-reactive may be incorporated into the isocyanate component so as to an isocyanate-terminated prepolymer as one component in the system) is present. In the one-component system, the polyurethane foam may be prepared once the material is applied to a substrate. In the two-component system, the isocyanate component and the isocyanate-reactive component are provided separately, and after mixing of the two separate components the polyurethane foam may begin to form. Both the one-component and two-component systems may include a blowing agent.

The isocyanate component includes at least one isocyanate (e.g., a polyisocyanate and/or an isocyanate-terminated prepolymer). The isocyanate-reactive component includes at least a polyol component that includes one or more polyols. The isocyanate-reactive component may include an optional additive component that includes at least one optional additive (such as a blowing agent, a catalyst, a curative agent, a chain extender, a flame retardant, a viscosity modifier, a filler, a pigment, a stabilizer, a surfactant, a plasticizer, a zeolite, and/or other additives that modify properties of the resultant final polyurethane product). In exemplary embodiments, the isocyanate-reactive component may include at least the blowing agent and/or at least the blowing agent and catalyst.

In addition, according to embodiments, the isocyanate component and/or the isocyanate-reactive component include the ground crop residues. The ground crop residues may be pre-mixed (i.e., mixed before forming the polyurethane foam) with the isocyanate-component and/or the isocyanate-reactive component. In exemplary embodiments, at least a portion the ground crop residue (e.g., as a powder) is added to (e.g., mixed in with) the isocyanate-reactive component (e.g., in an entirety of the isocyanate-reactive component or a portion thereof) before forming the polyurethane polymer reaction product of the isocyanate component and isocyanate-reactive component.

In exemplary embodiments, a one-component system includes the isocyanate component, together with the isocyanate-reactive component, in the form of one or more isocyanate-terminated prepolymers in the composition for forming the polyurethane based foam. The isocyanate-terminated prepolymers are derived from polyisocyanates. The isocyanate-terminated prepolymer may have a free NCO (i.e., isocyanate moiety) content from 5 wt % to 30 wt % (e.g., 5 wt % to 25 wt %, 5 wt % to 20 wt %, 8 wt % to 18 wt %, etc.). The isocyanate-terminated prepolymer may account for from 20.0 wt % to 90.0 wt % of a total weight of the composition for forming the polyurethane based foam. In exemplary embodiments, a two-component system includes an isocyanate component having one or more polyisocyanates and/or one or more of the isocyanate-terminated prepolymers. For example, the two-component system may include from 10.0 wt % to 95.0 wt % (e.g., 20.0 wt % to 90.0 wt %, 40.0 wt % to 85.0 wt %, 45.0 wt % to 75.0 wt %, 45.0 wt % to 65.0 wt %, 45.0 wt % to 55.0 wt %, 49.0 wt % to 55.0 wt %, etc.) of the polyisocyanate, based on a total weight of the composition for forming the polyurethane foam.

Exemplary polyisocyanates include toluene diisocyanate (TDI) and variations thereof known to one of ordinary skill in the art, and diphenylmethane diisocyanate (MDI) and variations thereof known to one of ordinary skill in the art. Other isocyanates known in the polyurethane art may be used, e.g., known in the art for polyurethane based coatings. Examples, include modified isocyanates, such as derivatives that contain biuret, urea, carbodiimide, allophonate and/or isocyanurate groups may also be used. Exemplary available isocyanate based products include PAPI™ products, ISONATE™ products and VORANATE™ products, VORASTAR™ products, HYPOL™ products, HYPERLAST™ products, TERAFORCE™ Isocyanates products , available from The Dow Chemical Company.

The polyol component of the isocyanate-reactive component for forming the polyurethane based foam may include one or more polyols. The polyol component may include one or more polyols selected from the group of a polyether polyol, a polyester polyol, a polycarbonate polyol, a natural-oil derived polyol, and/or a simple polyol (such as glycerin, ethylene glycol, propylene glycol, and butylene glycol). For example, the one or more polyols may include one or more polyether polyols and/or one or more polyester polyols. The polyether polyols may be prepared, e.g., by the polymerization of epoxides, such as ethylene oxide, propylene oxide, and/or butylene oxide. The one or more polyols may have a hydroxyl number from 50 mg KOH/g to 550 mg KOH/g (e.g., 100 to 550 mg KOH/g). For example, the polyol component may include a high functional polyol component and a low functional polyol component. The high functional polyol component may include one or more polyols having a hydroxyl functionality of 4.0 or greater (e.g., from 4.0 to 7.0). The low functional polyol component may include one or more polyols having a hydroxyl functionality of less than 4.0 (e.g., from 2.0 to less than 4.0). In exemplary embodiments, at least 50.0 wt % (e.g., 50.0 wt % to 85.0 wt %) of the isocyanate-reactive component may be the high functional polyol component. Less than 30.0 wt % (e.g., from 1.0 wt % to 25.0 wt %, etc.) of the isocyanate-reactive component may be the optional additive component.

The isocyanate-reactive component may be reacted with the isocyanate component at an isocyanate index from 70 to 350 (e.g., 80 to 300, 90 to 250, 90 to 200, 90 to 180, 100 to 170, etc.). The isocyanate index is measured as the equivalents of isocyanate in the reaction mixture for forming the polyurethane network, divided by the total equivalents of isocyanate-reactive hydrogen containing materials in the reaction mixture, multiplied by 100. Considered in another way, the isocyanate index is the ratio of isocyanate-groups over isocyanate-reactive hydrogen atoms present in the reaction mixture, given as a percentage.

The additive component may include one or more blowing agents. Exemplary blowing agents include hydrofluorocarbons (HFC), hydrochlorofluoroolefin (HCFO), water, and carboxylic acids such as formic acid. Blowing agents known in the art for use in rigid polyurethane foams may be used.

The additive component may include one or more catalysts. For example, the additive component may include a tin and/or amine based catalyst. For example, the catalyst component may account for less than 5.0 wt % of a total weight of the isocyanate-reactive component. A curing agent including may be a bifunctional organic diamine compound or a trifunctional organic diamine compound. The optional chain extender component may include a chain extender, e.g., that has two isocyanate-reactive groups per molecule and may have an equivalent weight per isocyanate-reactive group of less than 400. The optional crosslinker component may include at least one crosslinker that has three or more isocyanate-reactive groups per molecule and an equivalent weight per isocyanate-reactive group of less than 400.

Various other additives, e.g., those known to those skilled in the art, may be included in the optional additive component. For example, coloring agents, water-binding agents, surface-active substances, extenders and/or plasticizers may be used. Dyes and/or pigments (such as titanium dioxide and/or carbon black), may be included in the optional additive component to impart color properties to the polyurethane elastomer. Pigments may be in the form of solids or the solids may be pre-dispersed in a polyol carrier. Reinforcements (e.g., flake or milled glass and/or fumed silica), may be used to impart certain properties. Other additives include, e.g., UV stabilizers, antioxidants, air release agents, and adhesion promoters, which may be independently used depending on the desired characteristics of the polyurethane foam.

The additive component and/or the polyurethane system may include or exclude any organic and inorganic solid fillers known in the art for use in rigid polyurethane foams. The solid fillers may be reinforcing fillers. For example, in some exemplary embodiments, such organic and/or inorganic solid fillers (such as reinforcement fillers) may be included with the ground crop residue (e.g., as a powder) in the resultant polyurethane based foam. In some exemplary embodiments, reinforcement fillers (such as mineral fibers/particles, glass fibers/particles, carbon fibers, and/or wood fibers/particles), may be excluded from the polyurethane system. In other exemplary embodiments, the additive component, the polyurethane system, and/or polyurethane based foam may exclude solid fillers such as fly ash, bottom ash, fine sand, ceramic fibers/particles, mineral fibers/particles glass fibers/particles, carbon fibers, carbon blacks, graphite, wood fibers/particles, talcs, clays, silicas, calcium carbonates, plastic powders (such as propylene based powders and acrylonitrile butadiene styrene—ABS-based powders), phosphates, oxides, and/or polyamides.

The polyurethane foam may be formed by a spraying and/or pouring application that applies the polyurethane system on a base substrate and/or a surface (e.g., on the surface of a heated mold or the use of a mold may be avoided). The spraying and/or pouring application may be done on a conveyor device, e.g., in a continuous manner For example, the spraying and/or pouring may be done inside a panel cavity, in order for the cured foam to become the insulation core of sandwich panels made with suitable substrates such as steel, paper, aluminum, or other materials used in the sandwich panel industry.

All parts and percentages are by weight unless otherwise indicated. All molecular weight information is based on number average molecular weight, unless indicated otherwise.

EXAMPLES

Approximate properties, characters, parameters, etc., are provided below with respect to various working examples, comparative examples, and the materials used in the working and comparative examples.

The following materials are principally used:

Formulated System A formulated system for forming polyurethanes that includes a blend having at least a high functional polyether polyol, a low functional polyol, and additives such as a catalyst and blowing agent, which formulated system is marketed as usable for production of discontinuous rigid faced panels for prefabricated buildings and cold storage warehouses (available from The Dow Chemical Company as VORACOR™ CD 804).

Isocyanate Polymeric methylene diphenyl di-isocyanate, also referred to as PMDI (available from The Dow Chemical Company as VORANATE™ M 220).

Sunflower Hulls An oilseed crop residue additive that is a powder material prepared by taking raw sunflower hulls and exposing the material to a vacuum oven between 70 to 100° C. to reduce moisture content from their initial loss on drying of 8-13% to approximately 2-5% over a period of 13 days. The resultant dried material is subsequently ground to an average particle size of less than 600 µm using the Laboratory Mill 3100 from Perten Instruments, with a 1 mm spacing size hammer mill.

Wood Powder A woody additive that is a wood powder also referred to as Scots Pine.

Soybean Hulls A legume crop residue additive that is a powder material prepared by taking raw soybean hulls and exposing the material to a vacuum oven to reduce moisture content from their initial loss on drying 8-13% to approximately 2-5% over a period of 13 days. The resultant dried material is subsequently ground with a 1 mm spacing size hammer mill. The resultant material has less than 5.0 wt % loss on drying.

The approximate conditions (e.g., with respect to time and amounts) and properties for forming Working Examples 1 to 4 and Comparative Examples A to F are discussed below.

Working Examples 1, 2, 3, and 4, and Comparative Example A, are prepared according to the following approximate formulations in Table 1, below. Each of Working Examples 1 to 4 and Comparative Example A are prepared using 100 parts by weight of the Formulated System and 120 parts by weight of the Isocyanate, and Working Examples 1 to 4 further include with varying amounts of the Sunflower Hulls. Comparative Example A is a control example that excludes any ground crop residue additives.

TABLE 1

|  | Working Example 1 | Working Example 2 | Working Example 3 | Working Example 4 | Comp. Example A |
|---|---|---|---|---|---|
| Formulation (wt %) | | | | | |
| Formulated System | 44.5 | 43.4 | 42.7 | 41.8 | 45.5 |
| Isocyanate | 53.5 | 52.1 | 51.3 | 50.2 | 54.5 |
| Sunflower Hulls | 2.0 | 4.5 | 6.0 | 8.0 | — |
| Properties | | | | | |
| Gel Time (sec) | 230 | 235 | 235 | 238 | 220 |
| Applied Density (g/L) | 40.0 | 40.6 | 39.5 | 40.0 | 38.0 |
| Thermal Conductivity (mW/m · °K at 10° C.) | 24.45 | 24.74 | 24.80 | 24.61 | 24.33 |
| Water Vapor Resistivity Factor (µ-value) | 19.0 | 24.6 | 29.7 | 38.2 | 26.1 |

Each of Comparative Examples B, C, D, E, and F are prepared using 100 parts by weight of the Formulated System and 120 parts by weight of the Isocyanate, with varying amounts of wood or legume crop residues.

TABLE 2

|  | Comp. Example B | Comp. Example C | Comp. Example D | Comp. Example E | Comp. Example F |
|---|---|---|---|---|---|
| Formulation (wt %) | | | | | |
| Formulated System | 44.5 | 42.7 | 41.8 | 44.5 | 42.7 |
| Isocyanate | 53.5 | 51.3 | 50.2 | 53.5 | 51.3 |
| Wood Powder | 2.0 | 6.0 | 8.0 | — | — |
| Soybean Hull | — | — | — | 2.0 | 6.0 |

TABLE 2-continued

|  | Comp. Example B | Comp. Example C | Comp. Example D | Comp. Example E | Comp. Example F |
|---|---|---|---|---|---|
| Properties | | | | | |
| Gel Time (sec) | 200 | 190 | 198 | 200 | 200 |
| Applied Density (g/L) | 37.8 | 36.8 | 38.1 | 37.5 | 40.6 |
| Thermal Conductivity (mW/m · °K at 10° C.) | 24.27 | 25.44 | 26.60 | 28.20 | 28.70 |
| Water Vapor Resistivity Factor (μ-value) | 24.7 | 25.7 | 27.8 | 26.3 | 25.0 |

Table 1 above shows that for Working Examples 1 to 4 it is possible to modulate water vapor resistivity factor at controlled thermal conductivity by using different amounts of the Sunflower Hulls as an additive in a polyurethane rigid foam system molded at a desired applied density within a range of 35 to 45 kg/m$^3$. In particular, it is shown that as the amount of the ground sunflower hull powder including in the composition increases, the water vapor resistivity factor increases.

In contrast, each of Comparative Examples B to F that includes either the Wood Powder or the Soybean Hulls shows almost negligible influence on water vapor resistivity factor. Further, at least Comparative Example B relative to Comparative Example D, shows worsening of thermal conductivity.

Referring to Working Examples 1 to 4, and Comparative Examples A to F, the samples are prepared as molded rigid blown foams by hand-mixing the components in the indicated amounts to form a reaction mixture and pouring of the reaction mixture into a closed aluminum mold of dimensions 20×20×10 cm and heated to 40° C. The aluminum mold may be previously treated with a release agent, such as a release agent available from the ACMOSIL product line. As a preliminary step, the additive, if included, is dispersed in the Formulated System at the indicated loading amount to form a viscous slurry. As such, for the viscous slurry or the Formulated System for Comparative Example A, is reacted with the Isocyanate coupled with mixing at 2500 rpm with a Heidolph air mixer. Next, the resultant reacting foam is poured into the closed aluminum mold and allowed to react. The resultant foam is de-molded after about 15 minutes.

Reactivity parameter, also referred to as gel time, is measured by means of an iron stick merged inside the reacting foam and recorded as soon as a filamentous sticking is visually observed on the iron stick. Applied density is measured according to ASTM D-1622. Thermal conductivity is measured according to EN 12667. Water vapor permeability and water vapor resistivity factor are measured according to EN 12086. As would be understood by a person of ordinary skill in the art, the properties may be measured after waiting a period of 24 hours to 120 hours in a controlled environment.

The invention claimed is:

1. A method of producing a polyurethane based foam, comprising:
    providing a ground crop residue including sunflower hulls having an average particle size of less than 10 mm and that is prepared by grinding crop residues including sunflower hulls;
    providing a polyurethane system that includes an isocyanate component and an isocyanate-reactive component, the polyurethane system having an isocyanate index from 70 to 350;
    forming a modified polyurethane system by adding the ground crop residue including sunflower hulls to the polyurethane system in a range from 1.0 wt% to 20.0 wt%, based on a total weight of the modified polyurethane system; and
    forming the polyurethane based foam so as to have an applied density from 30 kg/m$^3$ to 75 kg/m$^3$, according to ASTM D-1622, and to have the ground crop residue including sunflower hulls embedded within polyurethane polymers that are a reaction product of the isocyanate component and the isocyanate-reactive component of the polyurethane system.

2. The method as claimed in claim 1, wherein at least a portion of the ground crop residue including sunflower hulls is added to the isocyanate-reactive component before forming the reaction product of the isocyanate component and isocyanate-reactive component.

3. The method as claimed in claim 1, wherein the ground crop residue including sunflower hulls has an average particle size of less than 2 mm.

4. The method as claimed in claim 1, wherein the polyurethane based foam has a thermal conductivity from 18.0 mW/m.° K at 10° C. to 25.0 mW/m.° K at 10° C., measured according to according to EN 12667.

5. The method as claimed in claim 1, wherein:
    the water vapor diffusion resistance factor of the polyurethane based foam formed by the method of claim 1 is greater than 28.0.

6. A method of producing an insulating panel, comprising:
    providing a base substrate; and
    producing a polyurethane based foam by the method of claim 1 on the base substrate.

* * * * *